3,423,506
MONO-N-PHENETHYL NEOMYCIN B
Gerard Nomine, Noisy-le-Sec, Lucien Penasse, Paris, and Pierre Barthelemy, Clichy-Sous-Bois, France, assignors to Roussel-UCLAF, Paris, France, a corporation of France
No Drawing. Filed Mar. 19, 1964, Ser. No. 353,284
Claims priority, application France, Mar. 25, 1963, 929,099; June 25, 1963, 939,290
U.S. Cl. 424—181
Int. Cl. A61k 21/00
7 Claims

ABSTRACT OF THE DISCLOSURE

Novel mono-N-phenethyl-neomycin B and its non-toxic, pharmacologically acceptable acid addition salts, and to a process for its preparation which has anti-microbe activity.

---

Mono-N-phenethyl-neomycin B and its acid addition salts possess a strong antimicrobic activity which is several times greater than the activity of neomycin B and its salts.

It is an object of the invention to provide the novel product, mono-N-phenethyl-neomycin B and its acid addition salts.

It is another object of the invention to provide a novel process for the preparation of mono-N-phenethyl-neomycin B.

It is a further object of the invention to provide anti-microbic compositions.

It is an additional object of the invention to provide a novel method of combatting microbes.

These and other objects and advantages of the invention will become obvious from the following detailed description.

The novel products of the invention are selected from the group consisting of mono-N-phenethyl-neomycin B and its non-toxic, pharmacologically acceptable acid addition salts. Examples of suitable non-toxic acids are inorganic acids such as sulfuric acid, hydrochloric acid, etc. and organic acids such as acetic acid, citric acid, tartaric acid, etc.

The process for the preparation of mono-N-phenethyl-neomycin B comprises condensing neomycin B with phenylacetaldehyde under alkaline conditions to form a condensation product, reducing the latter with an alkali metal borohydride to form a mixture of di-N-phenylethyl-neomycin B and mono-N-phenethyl-neomycin B, isolating and separating the two components in the form of their acid addition salts and recovering the acid addition salt mono-N-phenethyl-neomycin B which may be reacted with an ion-exchange resin to form the free mono-N-phenethyl-neomycin B.

The isolation of the products obtained from the reaction media is effected easily by bringing the reaction mixture to a pH of 5.5 to 6 by the addition of an acid, such as sulfuric acid and contacting the reaction mixture with a cation exchange resin such as, for example, Amberlite IRC 50 (methacrylic-carboxylic acid cation exchange resin) previously rendered alkaline with ammonia. After washing the resin with water, an elution with a basic aqueous solution such as a relatively concentrated ammonium hydroxide solution, i.e. a normal solution, is effected and the eluate is neutralized with an acid such as sulfuric acid and concentrated under vacuum. Precipitation of the mixture of the mono- and di-substituted products is caused by the addition of an appropriate solvent such as methanol in which the said products are insoluble.

In order to separate the mono- and di-substituted derivatives of neomycin B, the raw mixture of the said products is dissolved in water and the resulting solution is contacted with a cation exchange resin such as Amberlite IRC 50 previously made alkaline with ammonia. Elution of the resin with increasingly concentrated ammonium hydroxide solution such as N/15 and N/12, gives two fractions which correspond respectively to di-N-phenethyl-neomycin B and to mono-N-phenethyl-neomycin B. Each fraction is acidified with an acid such as sulfuric acid and then is passed through a cation exchange resin such as Amberlite IRC 50, previously alkalinized with ammonia. The resin is eluted with N ammonium hydroxide solution and the eluate is reduced to a small volume and acidified with an acid such as sulfuric acid. Then the eluate is poured into a solvent such as methanol, in which the product formed is insoluble, and the acid salt of di-N-phenethyl-neomycin B and the acid salt of mono-N-phenethyl-neomycin B are respectively vacuum filtered and recovered.

Mono-N-phenethyl-neomycin B in the free form may be obtained by passing an aqueous solution of the acid salt of mono-N-phenethyl-neomycin B through an ion exchange resin to isolate mono-N-phenethyl-neomycin B which can be transformed into all other therapeutically compatible salts by simple neutralization with the desired acid. A different procedure for the extraction of the mono- and di-substituted derivatives of neomycin B from the reaction media may be followed without departing from the body of the present invention. It is possible to start with the separation of the said derivatives by adsorption and fractional elution with the aid of dilute ammonium hydroxide solutions and then to effect singly an adsorption with elution with a concentrated ammonium hydroxide solution. Similarly, the isolation of the products can be realized by lyophilization of their aqueous neutralized solutions.

The novel anti-microbic compositions of the invention are comprised of a compound selected from the group consisting of mono-N-phenethyl-neomycin B and its non-toxic, pharmacologically acceptable acid addition salts and a major amount of an inert pharmaceutical carrier. The compositions may be prepared in the form of sterile powders to be diluted in an appropriate solvent at the moment of use, in ovules, in vaginal jellies, in vaginal tablets, in pommades, in collyrium, in auricular drops, in nasal solutions and in collutories prepared in the usual manner.

The compositions are useful for the treatment of sinusitis, rhinitis, otorrhea, suppurated bronchetasia, acute bronchitis or chronic bronchitis, purulent pleuresy, osteomylitis, purulent arthritis, gingivitis, stomatitis, furoncles, anthrax, impetigo, ecthyma, infectious eczema, wounds, burns, infectious ulcers of the legs, conjunctivitis, angina, pharyngitis, laryngitis, tracheitis.

The novel method of the invention for combatting microbes comprises administering to a warm blooded animal an effective amount of a compound selected from the group consisting of mono-N-phenethyl-neomycin B and its non-toxic, pharmacologically acceptable acid addition salts. The said compounds can be used in infiltrations, in local applications on the skin or on mucous membranes at doses from one half to the equivalent dosage of neomycin B.

In the following example there are described several preferred embodiments to illustrate the invention. However, it should be understood that the invention is not intended to be limited to the specific embodiments.

EXAMPLE.—PREPARATION OF MONO-N-PHENETHYL-NEOMYCIN B SULFATE 4.2 gm. of sodium carbonate and 80 cc. of ethanol were added to a solution of 15 gm. of neomycin B in 50 cc. of water. The reaction mixture was agitated and in a space of one hour, 12 gm. of phenylacetaldehyde in 400 cc. of 65% ethanol were introduced. The agitation was maintained for a period of one-half hour and then the alcohol was evaporated under a reduced nitrogen pressure. Some water was re-added until the volume of the mixture was equal to the initial volume and then 4.5 gm. of sodium borohydride in 100 cc. of water were introduced. The reaction mixture was agitated for a period of one hour at room temperature after which the pH of the reaction mixture was brought to 5.5 to 6.0 by the addition of 45 cc. of 5 N sulfuric acid. The reaction mixture was filtered and the filtrate was introduced into a column of IRC 50 Resin previously alkalinized with normal ammonium hydroxide solution. The column was washed with water and eluted with normal ammonium hydroxide solution. The eluate was concentrated under vacuum and 5 N sulfuric acid was re-added until a pH of 5.5 to 6 was obtained. The solution was treated with active carbon black and filtered and the filtrate was poured into methanol. The precipitate formed was vacuum filtered, washed with methanol and dried to obtain 13.1 gm. of raw product.

12 gm. of this product were dissolved in 600 cc. of water and subjected to chromatography through a column of IRC 50 Resin previously alkalinized with ammonium hydroxide solution and by elution with N/15, then N/12 ammonium hydroxide solution between 0 and +5° C., two fractions were obtained. The first of these fractions were acidified to a pH of 5.5 to 6 by the addition of 5 N sulfuric acid and it was introduced into a column of carboxylic acid resin IRC 50 previously alkalinized with sodium hydroxide solution. The resin was washed with water, then eluted with normal sodium hydroxide solution and the eluate was reduced to a small volume by evaporation under vacuum and was acidified by the addition of 5 N sulfuric acid solution to a pH of 5.5 to 6. Then the solution was poured into methanol and the product formed was vacuum filtered to obtain 1.36 gm. of the sulfate of di-[N-(phenethyl)]-neomycin B having a specific rotation $[\alpha]_D^{20} = +48°$ (c.=1% in water).

ULTRAVIOLET SPECTRA $\lambda_{max.}$ 252 m$\mu$ $E_{1\ cm.}^{1\%}$ = 3.6

$\lambda_{max.}$ 257 m$\mu$ $E_{1\ cm.}^{1\%}$ = 4.1

$\lambda_{max.}$ 262–263 m$\mu$ $E_{1\ cm.}^{1\%}$ = 3.4

$\lambda_{max.}$ 288 m$\mu$ $E_{1\ cm.}^{1\%}$ = 1.1

This compound is not described in the literature.

The second fraction, treated in an analogous manner, gave 5.07 gm. of the sulfate of mono-N-phenethyl-neomycin B having a specific rotation $[\alpha]_D^{20} = +49°$ (C.=1% in water).

ULTRAVIOLET SPECTRA $\lambda_{max.}$ 251 m$\mu$ $E_{1\ cm.}^{1\%}$ = 1.7

$\lambda_{max.}$ 257 m$\mu$ $E_{1\ cm.}^{1\%}$ = 2.0

$\lambda_{max.}$ 262–263 m$\mu$ $E_{1\ cm.}^{1\%}$ = 1.6

The latter product occurred in the form of a white solid solvated at 8.3%, soluble in water and insoluble in the usual organic solvents such as benzene, chloroform, alcohol, ether and acetone.

This compound is not described in the literature.

PHARMACOLOGICAL STUDY OF MONO-N-PHENETHYL-NEOMYCIN B SULFATE

(I) Antibiotic activity in vitro (A) *Turbidimetric method.*—A micro-organism inoculated in a nutritive media and cultivated at a determined temperature and at a determined period of time, develops rapidly while giving a disturbance in the culture media. The antibiotic activity of mono-N-phenethyl-neomycin B sulfate was determined by allowing both a series of doses of the product of reference and a series of doses of the product to be tested to act upon a germ chosen for its sensitivity. After incubation, the opacity produced by each does of the antibiotic was measured by the aid of an electrophotometer.

The antibiotic activity of mono-N-phenethyl-neomycin B sulfate was studied on different gram positive and gram negative germs and the activity was determined with reference to that of the sulfate of neomycin B (testing 725 $\gamma$/mg. on the dried product). The medicine was utilized in aqueous solution at a concentration of 1,000$\gamma$/cc.

(a) *Staphylococcus aureus* ATCC 9144.—A standard scale of neomycin B base on concentrations of 0.5–1–2–3.12–5$\gamma$/cc. and a culture media based on bacteriological peptone and fetal peptone seeded at 0.5% with a broth culture of Staphylococcus aureus ATCC 9144 aged 24 hours was utilized. Mono-N-phenethyl-neomycin B sulfate was utilized at doses of 13.3, 20, 40, 66.6 and 80$\gamma$/cc. The mixture was heated on a water bath at 37° C. for a period of three hours and the activity was measured with an electrophotometer.

(b) *Klebsiella pneumoniae* ATCC 9997.—The standard range of neomycin B base was 3.12, 5, 6.25, 7.50, 10 and 12.5$\gamma$/cc. The culture media was based on bacteriological peptone adjusted to a pH of 7.5 and inoculated with a suspension of germs at a concentration such that is allowed 75% of the light to pass. Mono-N-phenethyl-neomycin B sulfate was utilized at doses of 20, 40, 100 and 200$\gamma$/cc. The culture was heated in a water bath at 37° C. for a period of three hours and thirty minutes and the activity was measured with an electrophotometer.

(c) *Colibacilli* ATCC 11105.—The standard range of neomycin B base was 20, 25, 31.2, 50, 62.5 and 75$\gamma$/cc. The culture media was based on bacteriological peptone adjusted to a pH of 7.5 and inoculated at 1% with a broth culture of the germ, aged 24 hours. Mono-N-phenethyl-neomycin B sulfate was utilized at doses of 20, 25, 31.2, 50, 62.5 and 75$\gamma$/cc. The culture was heated on a water bath at 37° C. for a period of 3 to 4 hours and the activity was measured with an electrophotometer.

(d) *Colibacilli* ATCC 9637.—The standard range of neomycin B base was 20, 25, 31.2, 50, 62.5 and 75$\gamma$/cc. The culture media was based on bacteriological peptone adjusted to a pH of 7.5 and inoculated at 1% with a broth culture of the germs, aged 24 hours. Mono-N-phenethyl-neomycin B sulfate was utilized at doses of 20, 25, 31.2, 50, 62.5, 75 and 100$\gamma$/cc. The culture media was heated in a water bath at 37° C. and the activity was measured with an electrophotometer.

The results obtained in (a) to (d) expressed in neomycin B base, are summarized in Table I.

TABLE I

| Germs: | Mono-N-phenethyl-neomycin B sulfate, $\gamma$/mg. |
|---|---|
| Staphylococcus aureus ATCC 9144 | 1.365 |
| Klebsiella pneumoniae ATCC 9997 | 1.885 |
| Colibacilli ATCC 11105 | 1.400 |
| Colibacilli ATCC 9637 | 1.180 |

(B) *The gradient-method in a Szybalski Agar-agar food medium.*—A test comparing mono-N-phenethyl-neomycin B sulfate with neomycin B sulfate after an incubation of 18 hours at 37° C. was made and the results of Table II were obtained.

TABLE II

| Germs | Patho-genic power | Gram | Neomycin B sulfate, γ/cc. | Mono-N-phen-ethyl-neomycin B sulfate, γ/cc. |
|---|---|---|---|---|
| Bacillus megatherium ATCC 8245 | − | + | <0.1 | <0.1 |
| Bacillus thuringiensis ATCC 10792 | − | + | >10 | 1.3 |
| Mircrococcus pyogenes ATCC 6538 | + | + | 1 | 0.37 |
| Micrococcus pyogenes FDA 209 p | + | + | 1 | 0.31 |
| Micrococcus pyogenes Institut Pasteur No. 7 | ++ | + | 1 | 0.46 |
| Micrococcus pyogenes Institut Pasteur 4435 | ++ | + | 1 | 0.40 |
| Sarcine | ++ | + | 0.5 | >20 |
| Sarcina lutea ATCC 9341 | + | + | 1 | 1.9 |
| Streptococcus agalactiae Institut Pasteur | − | + | 10 | 10 |
| Enterocoque Lutz souche Roussel-Uclaf No. 1052 | ++ | + | 10 | 6.4 |
| Enterocoque Lutz souche Roussel-Ucalf No. 1053 | ++ | + | >100 | 55 |
| Klebsiella pneumoniae Val de Grace | + | − | 1.2 | 1 |
| Klebsiella pneumoniae PCI 602 | − | − | 2.8 | 1 |
| Salmonella enteritidis | + | − | 10 | 7 |
| Salmonella paratyphi A | + | − | 1 | 1 |
| Salmonella paratyphi B | + | − | 10 | 5.2 |
| Pasteurella multocida | ± | − | 10 | 10 |
| Pasteurella bovis | ± | − | >10 | 5.5 |
| Proteus mirabilis ATCC 8169 | + | − | 10 | 10 |
| Proteus mirabilis ATCC 10876 | + | − | 10 | 10 |
| Pseudomonas aeruginosa ATCC 10145 | + | − | >100 | >100 |
| Pseudomonas aeruginosa ATCC 12055 | + | − | 40 | >100 |

On the whole, the mono-N-phenethyl-neomycin B sulfate has an activity clearly superior to that of neomycin B sulfate and the increase of activity is particularly clear on the staphylococci, the Klebsiella and the salmonellas.

(C). Activity in vitro on diverse strains of clinical origin.—The determinations of activity were effected on cultures in Oxoid No. 2 media, adjusted to a pH of 7.4 and the readings were taken after 24 and 40 hours of incubation at 37° C. The minimal concentrations giving a total inhibition (C.M.I.) were observed and are summarized in Table III.

The results of these comparative determinations of the in vitro activity of mono-N-phenethyl-neomycin B sulfate with neomycin B sulfate showed that:

(a) With pathogenic staphylococci, the activity of the novel product is 2 to 5 times greater than that of neomycin B sulfate depending upon the particular strain;

(b) With enterococci and *Klegsiella pneumoniae*, the novel product is 2 to 5 times more active than neomycin B sulfate;

(c) With shigella, salmonella and colibacilli, it is equal or 2 to 4 times more active than neomycin B sulfate, and

TABLE III

[C.M.I. in μg./cc.]

| Strains | Origin | Neomycin B Sulfate 24 hrs. | Neomycin B Sulfate 40 hrs. | Mono-N-phenethyl-neomycin B Sulfate 24 hrs. | Mono-N-phenethyl-neomycin B Sulfate 40 hrs. |
|---|---|---|---|---|---|
| (A) Golden hemolytic *staphylococci*: | | | | | |
| No. 443/63 | Spit | 0.05 | 0.1 | 0.02 | 0.02 |
| No. 586/63 | Smear of ulcer of the leg | 0.05 | 0.15 | 0.05 | 0.05 |
| No. 37/63 | Smear of the throat | 0.15 | 0.15 | 0.10 | 0.10 |
| No. 225/63 | Stools | 0.1 | 0.1 | 0.02 | 0.02 |
| No. 311/63 | Hemoculture | 0.1 | 0.1 | 0.05 | 0.10 |
| No. 345/63 | Spit | 0.1 | 0.15 | 0.05 | 0.05 |
| No. 369/63 | Smear of a wound | 0.1 | 0.1 | 0.02 | 0.02 |
| No. 436/63 | Urine | 0.1 | 0.15 | 0.02 | 0.02 |
| No. 155/63 | Smear of the throat | 0.4 | 1.0 | 0.15 | 0.20 |
| No. 174/63 | do | 0.15 | 0.15 | 0.15 | 0.15 |
| No. 615/63 | Spit | 0.4 | 0.4 | 0.1 | 0.15 |
| No. 692/63 | do | 0.4 | 1.0 | 0.1 | 0.15 |
| No. 854 | Pus (osteitis) | 1.0 | 1.0 | 0.15 | 0.20 |
| No. 972 | Urine | 0.4 | 1.0 | 0.20 | 0.20 |
| No. 1029 | Annexite smear | 0.4 | 1.0 | 0.40 | 0.40 |
| No. 1146 | Gaseous gangrene pus | 0.02 | 0.15 | 0.02 | 0.05 |
| No. 292 | Smear of the throat | 0.05 | 0.4 | 0.05 | 0.05 |
| No. 1712 | Spit | 0.05 | 0.1 | 0.05 | 0.05 |
| (B) Enterococci: | | | | | |
| No. 6582 | do | >10.0 | | 2.00 | 2.00 |
| P.C.I. M 19 | | 10.0 | >10.0 | 2.00 | 10 00 |
| (C) Escherichia coli: | | | | | |
| "Normaflore" | | 5.0 | 5.0 | 2.00 | 2.00 |
| No. 3614/62, 26 B 6 | Stools | 0.5 | 0.5 | 0.50 | 0.50 |
| (D) Klebsiella pneumoniae: No. 10031 | | 0.1 | 0.1 | <0.05 | <0.05 |
| (E) Salmonella: S. para B, No. 5159/62 | Stools | 2.0 | 2.0 | 0.50 | 0.50 |
| S. typhimurium, No. 5939/62 | do | 0.5 | 0.5 | 0.50 | 0.50 |
| (F) Shigella: | | | | | |
| Sh. sonnei, No. 6418/62 | do | 0.5 | 0.5 | 0.50 | 0.50 |
| Sh. flexneri | do | 0.5 | 0.5 | 0.50 | 0.50 |

NOTE.—The designation "Normaflore" is the pharmaceutical specialty sold by DOM Laboratories of France.

(D) Activity in vitro with reference to tuberculosis bacilli.—The activity in vitro was determined in Dubos media after 10 days of incubation and the results are summarized in Table IV.

TABLE IV

| Strains | C.M.I. in μg./cc. | |
|---|---|---|
| | Neomycin B sulfate | Mono-N-phenethyl-neomycin B sulfate |
| Micobacterium tuberculosis: | | |
| H. 37 Rv | 0.1 | 0.05 |
| H. 800 | 5 | 3 |

(d) With tubercular bacilli, the activity of the novel product is about 2 times greater than that of neomycin B sulfate.

(II) Comparative study of the "in vivo" activity in experimental bacterial infections (A) Experimental infections with colibacilli in mice.—The tests were effected on lots of 10 mice infected intraperitoneally with a culture of *Escherichia coli* (star strain) and the animals were treated by a single subcutaneous administration of the antibiotic in aqueous solution. The therapeutic effect was determined by the death rate and the size of lesions. The results are summarized in Table V.

TABLE VI

| Antibiotic | Doses administered (mg. per mouse) | Efficacy, percent |
|---|---|---|
| Neomycin B sulfate | 0.5 | 100 |
|  | 0.25 | 80 |
|  | 0.10 | 30 |
| Mono-N-phenethyl-meomycin B sulfate | 0.25 | 100 |
|  | 0.10 | 50 |
|  | 0.05 | 30 |

The results of Table V show that mono-N-phenethyl-neomycin B sulfate is twice as active as neomycin B sulfate.

(B) Experimental infections with staphylococci (a) Strain of *Staphylococci aureus* TIN (penicillin sensitive strain).—The tests were effected on lots of 10 mice infected intraperitoneally by injection of a culture of staphylococcus aureus, strain TIN, and the animals were treated by subcutaneous administration of the antibiotic in aqueous solution immediately after the inoculation and 18 hours after the inoculation. The therapeutic effect was determined by the death rate and the size of the lesions and the results are summarized in Table IV.

TABLE V

| Antibiotic | Doses administered (mg. per mouse) | Efficacy, percent |
|---|---|---|
| Neomycin B sulfate | 1 | 90 |
|  | 0.5 | 82 |
|  | 0.25 | 63 |
|  | 0.10 | 52 |
| Mono-N-phenethyl-neomycin B sulfate | 0.5 | 96 |
|  | 0.25 | 89 |
|  | 0.10 | 76 |
|  | 0.05 | 57 |

(b) Strain of *Staphylococcus aureus* BEN (strain slightly sensitive to penicillin).—Using the same procedure as in the case of the TIN strain, the results obtained are summarized in Table VII.

TABLE VII

| Antibiotic | Doses administered (mg. per mouse) | Efficacy, percent |
|---|---|---|
| Neomycin B sulfate | 1 | 100 |
|  | 0.5 | 90 |
|  | 0.25 | 64 |
| Mono-N-phenethyl-neomycin B sulfate | 0.5 | 100 |
|  | 0.25 | 84 |
|  | 0.10 | 63 |

In addition, by administration per os at a dose of 1 mg. per mouse, mono-N-phenethyl-neomycin B sulfate presented quite an important action (57%) whereas neomycin B sulfate had practically no efficacy.

(III) Determination of toxicity

The tests of acute toxicity were effected on lots of 10 mice of the Rockland strain weighing between 18 and 22 gm. Mono-N-phenethyl-neomycin B sulfate was placed in solution in water and injected intravenously and the animals were held under observation for a period of 7 days. The average lethal dose ($DL_{50}$) determined by the graphic method of Tainter and Miller was found equal to 43 mg./kg.±3 which value is almost identical to that of neomycin B sulfate.

Various modifications of the process and compositions of the invention may be made without departing from the spirit or scope thereof, and it is to be understood that the invention is to be limited only as defined in the appended claims.

We claim:
1. A compound selected from the group consisting of mono-N-phenethyl-neomycin B and its non-toxic, pharmacologically acceptable acid addition salts.
2. Mono-N-phenethyl-neomycin B sulfate.
3. A process for the preparation of mono-N-phenethyl-neomycin B which comprises condensing neomycin B with phenylacetaldehyde under alkaline conditions to form a condensation product, reducing the latter with an alkali metal borohydride to form a mixture of di-N-phenethyl-neomycin B and mono-N-phenethyl-neomycin B, isolating and separating the two components in the form of their acid addition salts, and contacting the acid addition salt of mono-N-phenethyl-neomycin B with an ion-exchange resin to form free mono-N-phenethyl-neomycin B.
4. A process for the preparation of mono-N-phenethyl-neomycin B which comprises condensing neomycin B with phenylacetaldehyde under alkaline conditions to form a reaction mixture, reducing the latter with an alkali metal borohydride to form a reaction mixture containing di-(N-phenethyl)-neomycin B and mono-N-phenethyl-neomycin B, adsorbing the said mixture in the form of acid addition salts on a cation exchange resin and eluting it with a basic aqueous solution to isolate the said mono- and di-derivatives of neomycin B, adsorbing the latter on a cation exchange resin and fractionally eluting mono-N-phenethyl neomycin B with a basic aqueous solution.
5. A process for the preparation of mono-N-phenethyl-neomycin B which comprises condensing neomycin B with phenylacetaldehyde under alkaline conditions to form a reaction mixture, reducing the latter with an alkali metal borohydride to form a reaction mixture containing di-(N-phenethyl)-neomycin B and mono-N-phenethyl-neomycin B, adsorbing the said mixture in the form of acid addition salts on a cation exchange resin and eluting it with a basic aqueous solution to isolate the said mono- and di-derivatives of neomycin B, adsorbing the latter on a cation exchange resin previously alkalinized with ammonium hydroxide and fractionally eluting mono-N-phenethyl-neomycin B with a first N/15 and N/12 ammonium hydroxide.
6. Anti-microbic composition comprised of an active compound selected from the group consisting of mono-N-phenethyl-neomycin B and its non-toxic, pharmacologically acceptable acid addition salts and a major amount of an inert pharmaceutical carrier.
7. The composition of claim 6 wherein the active compound is mono-N-phenethyl-neomycin B sulfate.

References Cited

UNITED STATES PATENTS 2,779,620   7/1957   Waksman et al. _____ 167—65

ALBERT T. MEYERS, *Primary Examiner.*

D. M. STEPHENS, *Assistant Examiner.*